Dec. 7, 1965   B. C. KALUSTYAN   3,221,703
METHOD AND APPARATUS FOR DETECTING VARIATIONS IN PRESSURE
Filed Aug. 6, 1963
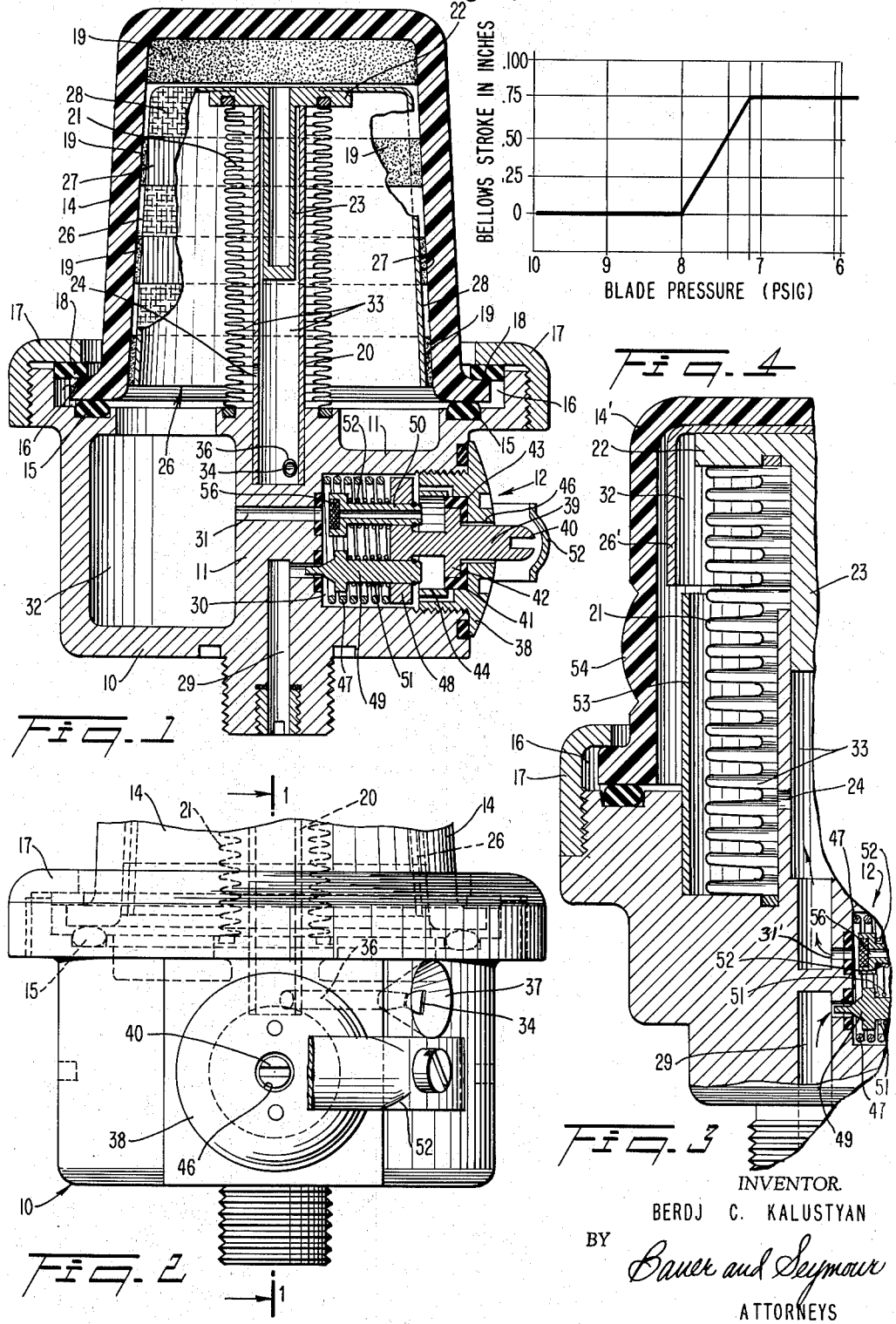
INVENTOR.
BERDJ C. KALUSTYAN
BY
Bauer and Seymour
ATTORNEYS United States Patent Office 3,221,703
Patented Dec. 7, 1965

3,221,703
METHOD AND APPARATUS FOR DETECTING VARIATIONS IN PRESSURE
Berdj C. Kalustyan, Park Ridge, N.J., assignor to Trodyne Corporation, Teterboro, N.J., a corporation of New Jersey
Filed Aug. 6, 1963, Ser. No. 300,347
14 Claims. (Cl. 116—70)

This invention relates to pressure sensitive instrumentation and more particularly to instruments responsive to variations in gaseous pressures.

An object of the present invention is to provide a novel instrument which is highly sensitive to relatively small changes in pressure.

Another object of the invention is to provide a novel pressure indicating device capable of substantial mechanical movement in response to very small changes of pressure differential and thus capable of promptly detecting even very slow leaks from a high pressure area to a relatively lower pressure area.

A further object is to provide a device of the above character in combination with novel valve means for testing the performance of such device under simulated operational conditions.

Still another object is to provide an instrument of the above type which is of small size and light weight, but rugged and capable of efficient and effective operation for long periods of time under severe operating conditions.

A still further object is to provide a novelly constructed indicating instrument of small size which embodies novel visual indicating means and may be visually read from a relatively great distance at all times of day and at night with the aid of a light beam.

It is also an object of the invention to provide a novel pressure sensitive indicating device comprising visual indicating means having a relatively wide range of movement in response to a relatively small change in pressure.

Another object is to provide a novelty constructed instrument responsive to changes in gaseous pressure which will function effectively over a wide range of temperatures.

It is a further object of the invention to provide novel simplified means for sealing the pressurized chamber of a pressure sensitive instrument and for slowly releasing or dumping the pressure within the chamber to check the operational accuracy of the instrument.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views:

FIG. 1 is a front elevation view, partly in section and with parts broken away, illustrating one form of instrument embodying the invention, the section being taken on line 1—1 of FIG. 2;

FIG. 2 is a side elevation view of said instrument as viewed from the right in FIG. 1;

FIG. 3 is a partial sectional view illustrating a modification of the instrument of FIG. 1; and FIG. 4 is a graph illustrating the sensitivity of an instrument embodying the invention.

The embodiments of the invention illustrated in the drawings, by way of example, are in the form of small gaseous pressure sensitive indicators adapted for detecting and indicating changes of pressure. The specific constructions shown are designed for use in detecting and indicating a reduction of gaseous pressure in a confined space, such as the hollow interior of the rotating wing blade of a helicopter. The device is capable of providing early and clearly visible indication of even slow leakage of gases from the blades, such as may occur as a result of a crack in the blade structure.

The novel instrument of the invention, as illustrated in FIGS. 1 and 2, comprises a light weight metal housing or casing member 10 which may be and preferably is hollow except for a portion 11 that extends radially outward from the center region to house a valve mechanism 12 to be hereinafter described. A hollow, cup-shaped cover member 14 of transparent glass, plastic or the like is secured to housing member 10 in any suitable manner to provide an hermetic annular seal at the junction. As shown, the flanged lower end of cover 14 rests on a sealing gasket 15 and is held in position by a ring nut 17 and a gasket 18. If desired, the annular space 16 may be filled with a suitable sealing compound, such as polysulphide. The space within housing 10, 14 is thus sealed from the surrounding atmosphere and may accordingly be pressurized. For a purpose to appear hereinafter, the interior surface of cover 14 is thinly partially coated with paint or other suitable coating material to provide a series of spaced opaque rings 19. If desired, the material of the cover itself may be made partially opaque to provide the rings or opaque areas 19.

Means are provided for novel cooperation with the horizontally striped cover 14, 19 to detect and give a readily readable visual indication of a reduction of pressure within casing 10, 14. In the form shown in FIG. 1, said means includes a centrally disposed tube or sleeve 20 seated in a counterbore in casing portion 11 and extending upwardly to near the upper closed end of cover 14. Surrounding tube 20 is a resilient bellows 21 preferably made of very thin metal, such as spring tempered nickel, and suitably coated, such as by a very thin coating of silicone, to seal any pores or interstices therein. The lower end of the bellows is hermetically secured to casing portion 11, such as by soldering, and the upper end thereof is similarly sealed to and hermetically closed by a plate or disk 22. Projecting into tube 20 from plate 22 is a guide 23. The latter is shown as being hollow and may be varied as to length and wall thickness to vary the proportion between the gas containing volume of the casing 10, 14 within and without bellows 21. The interiors of sleeve 20 and bellows 21 may be in communication through a port 24 or a space suitably provided around guide 23.

An inverted cup-shaped indicating member 26 has a clearance fit in cover 14 and is supported on plate 22. The outer surface of the skirt portion of indicator 26 is horizontally striped comparably to cover 14. Any colors may be used but for purposes of description we shall assume that member 26 has red stripes 27 alternating with yellow stripes 28. The latter are preferably fluorescent or mirror surfaced to be readily visually distinguishable when illuminated by a spotlight or the like at night.

When the parts are in their normal operative positions illustrated in FIG. 1, the yellow stripes 28 are visible through cover 14 between opaque rings 19 and the red stripes are hidden behind the opaque rings. When a predetermined gaseous pressure differential exists between the pressures within and without bellows 21, the latter will expand to reverse the positions of the red and yellow stripes, thus making the red stripes visible between the opaque rings on the cover.

When the disclosed instrument is employed, by way of example, for the purpose of detecting a loss of pressure, such as in a pressurized cavity in a hollow rotor blade, the space 32 within casing 10, 14 around bellows 21 is connected to the cavity through a drilled passage 29, valve chamber 30 and passage 31. Thus, the space 32 will be at the same pressure as the blade cavity, which we can assume to be 10 p.s.i. for purposes of description. To provide satisfactory sensitivity and temperature compensation the space 33 within bellows 21 is pressurized to a suitable reference pressure, somewhat below the pressure in space 32, such as 7.5 p.s.i. Thus, normally the higher pressure in space 32 operates to compress resilient bellows 21 to the limit permitted by tube 20. Space 33 may be permanently pressurized through a tube 34 installed in a drilled passage 36 in casing portion 11 and sleeve 20. The outer end of tube 34 may then be pinched closed and sealed in any suitable known manner and buried, if desired, in a cone-shaped cavity 37 in the housing. Although a variety of gases may be used in the pressurized spaces, nitrogen is preferred for some applications.

Novel valve mechanism is contemplated by the invention whereby the space 32 may be simultaneously disconnected from its source of pressure and connected to atmosphere through means which will permit relatively slow controlled leakage or dumping of the pressurized gas therefrom and thus test the operability of the indicator under simulated operating conditions which should cause the indicator to function. Said valve mechanism also functions normally to seal the space 32 from the atmosphere. In the form illustrated, valve mechanism 12 comprises a cap 38 theadedly mounted in the outer end of chamber 30 and a valve member 39, the stem 40 of which slidably extends through a central opening in cap 38. If desired, stem 40 may be a separate part movable in passage 46 independently of the body of valve 39.

Within an internal counterbore 41 in said cap, the valve member 39 has a flange 42 fitted with a gasket or washer 43 made of silicone rubber or equivalent material. This flange and washer constitute a valve which normally covers passages 44 in the wall of cap 38 connecting chamber 30 to counterbore 41. The latter also communicates in some suitable manner with the atmosphere, such as by way of one or more slots 46 in cap 38 around stem 40. Thus, when stem 40, and hence valve 42, 43 are pressed to the left to uncover passages 44, the space 30 will be in communication with the atmosphere through passages 44 and 46. Valve 42, 43 is normally held in closed or seated position by a heavy coil spring 47 interposed between the inner end wall of chamber 30 and a flange 48 on member 39 which has a loose fit in the chamber 30.

Flange 48 slidably supports two valves 49 and 50 which cooperate respectively, with passages 29 and 31. Valve member flange 48 cooperates with split rings (not numbered) or the like to move the valves 49 and 50 to the right and hence to open position. These valves are yieldably urged to the left, as viewed in FIG. 1, by coil springs 51 and 52 interposed between the valve heads and flange 48. Thus, when stem 40 is pressed, valve 49 closes passage 29 and valve 50 seats around the right hand end of passage 31.

Valve 50 has a central through passage and a time delay filter 56 mounted in the head thereof. Said filter may be made of porous metal, metal cloth or equivalent material to permit gases from space 32 to leak slowly therethrough and thence through the stem of valve 50, passages 44 and slots 46 to the atmosphere. Thus, when stem 40 is pressed, preferably through the medium of a leaf spring guard 52, space 32 will be cut off at valve 49 from its source of pressure and connected to atmosphere through time delay filter 51. As the gases leak out, the pressure slowly drops in space 32, as it would in the case of a slow leak at the source of such pressure. In the assumed application, such a pressure reduction could result from a small crack in the propeller blade.

An instrument embodying the invention and adapted for the helicopter blade application has been built and successfully used to operate in accordance with the graph of FIG. 4 wherein the abscissae represent the movement of cup 26 by bellows 21 and the ordinates represent the pressure in space 32 and hence in the propeller blade. This device has a dead ban or zone from 10 to 8 lbs. pressure but this is not essential with the invention. It is desirable to effect the movement of indicator cup 26 through its entire stroke, the width of stripes 19, 27 and 28, during the smallest possible pressure change. The device in question produced a stroke of three-fourths of an inch during a pressure change of about 0.8 lb. between 8 and 7.2 p.s.i. thus providing a clear indication visible from a substantial distance in response to a very small change of pressure differential throughout a wide range of temperatures.

In the modification of FIG. 3 the fixed reference pressure is maintained in the space around the bellows and the somewhat higher source pressure to be controlled is admitted to the interior of the bellows through passage 31' and the valve mechanism 12 which may be the same as in FIG. 1. Thus, with the parts (FIG. 3) in normal position the bellows will be extended and hence in tension to contract when the gaseous pressure differential is reduced.

Although the indicating cup and casing cover of FIG. 1 could be used in FIG. 3, a somewhat different arrangement is shown. The upper portion of the cover 14' which normally surrounds the indicating cup 26' is opaque and the lower portion surrounding a cylinder 53 is transparent and preferably formed as an annular magnifying lens 54. The outer surface of fixed cylinder 53 which is normally visible through lens 54 may be colored yellow, the same as stripes 28 and the outer surface of cup 26' may be red to become visible when the bellows contracts to move the cup down to surround the cylinder 53.

There is thus provided pressure responsive apparatus which is novelly constructed to provide substantial mechanical movement of an indicator in response to small variations of pressure and hence readily visible indications of even small changes in pressure differentials. The novel apparatus contemplated by the invention embodies novel means whereby the same may be readily tested for operability under simulated normal operating conditions. Said apparatus, although highly sensitive to pressure variations, is nonetheless of rugged construction to withstand severe operating conditions for extended periods of time throughout a wide range of temperatures. The novel apparatus is also adapted to small, lightweight construction at relatively low-cost.

Although only a limited number of embodiments of the invention have been illustrated in the drawings and described in the foregoing specification, it is to be expressly understood that the invention is not limited thereto. For example, the inherent resiliency of the bellows or comparable expansible casing means may be replaced by separate resilient means in combination with a flexible or expansible casing constructed of non-resilient material, the resilient bias in each case being insufficient but tending to overcome the effect of a normal or desired differential in the gaseous pressures in spaces 32 and 33. Various other changes may be made, such as in the details of construction and in the arrangement of parts illustrated, as well as in the materials suggested without departing from the spirit and scope of the invention as will now be apparent to those skilled in the art.

What is claimed is:

1. A pressure sensistive instrument comprising a sealed rigid casing, a sealed resiliently expansible casing mounted in said rigid casing, an indicating member mounted on said expansible casing for linear movement thereby, said rigid casing having a wall portion through which said indicating member is visible, stop means in the rigid casing for limiting movement of said member in one direction by the expansible casing relative to said rigid casing, a gaseous medium under a predetermined operating pressure in one of said casings, and a gaseous medium under a different substantially constant predetermined reference pressure sealed within the other of said casings, the normal differential between said pressures being such that said member is normally maintained against said stop means with said expansible casing biased by its resiliency for moving said member in the other direction upon a predetermined reduction of said operating pressure.

2. A pressure sensitive instrument as defined in claim 1, wherein the gaseous medium under said operating pressure is within said expansible casing and the latter is biased in tension when said member is in its normal limiting position against said stop means.

3. A pressure sensitive instrument as defined in claim 1, wherein the gaseous medium under said reference pressure is sealed within said expansible casing and the latter is biased in compression when said member is in its normal limiting position against said stop means.

4. A pressure sensitive instrument as defined in claim 1, wherein said expansible casing comprises a collapsible bellows having a wall of resilient material.

5. A pressure sensitive instrument as defined in claim 1, comprising means for normally connecting the interior of said one of said casings to a source of a gaseous medium under said operating pressure, flow restricting means, and valve means for closing said connecting means and for connecting the interior of said one of said casings to the atmosphere through said flow restricting means.

6. A pressure sensitive instrument comprising a sealed rigid casing, a sealed resiliently expansible casing mounted in said rigid casing, an indicating member mounted on said expansible casing for linear movement thereby, said rigid casing having a wall portion through which said indicating member is visible, stop means for limiting movement of said member in one direction relative to said rigid casing, a gaseous medium under a predetermined pressure in one of said casings, a gaseous medium under a different predetermined pressure in the other of said casings, the differential between said pressures being such that said member is maintained against said stop means with said expansible casing biased by its resiliency for moving said member in the opposite direction, means including a valve chamber for normally connecting the interior of said one of said casings to a source of a gaseous medium under pressure, and valve means in said chamber comprising a first normally open valve for controlling communication between said source and said chamber, a second normally open valve adapted, when closed, to restrict flow from the interior of said one of said casings to said chamber and a third normally closed valve for controlling communication between said chamber and the exterior of said rigid casing.

7. A pressure sensitive instrument as defined in claim 6, comprising a common actuating member for simultaneously effecting movement of said first and second valves to closed and restricted flow positions, respectively, and thereafter opening said third valve.

8. A pressure sensitive instrument as defined in claim 7, wherein said actuating member is a part of said third valve and supports said first and second valves.

9. A pressure sensitive instrument as defined in claim 8, comprising resilient means for urging each of said valves toward closed position.

10. A pressure sensitive instrument as defined in claim 6, wherein said second valve has a central passage therein and a flow restricting filter in said passage.

11. A pressure sensitive instrument comprising a sealed rigid casing, a sealed resilient bellows mounted in said casing, an indicating member mounted on said bellows for linear movement thereby upon expansion and contraction thereof, guide means for said member, stop means for limiting movement of said member in one direction relative to said casing, a gaseous medium under predetermined pressure in each of said casing and bellows, the normal differential between said pressures being such as to maintain said member in a limiting position against said top means with said bellows biased by its own resiliency and tending to move said member in the opposite direction away from said stop means, said indicating member having a cylindrical flange surrounding said bellows and said rigid casing having a limited transparent wall portion across which said indicating member moves in response to variations in the differential between said pressures.

12. Pressure sensitive apparatus comprising an exterior hollow casing, an interior casing mounted within said exterior casing, said interior casing being resilient and linearly expansible and contractable relative to the exterior casing, stop means on the exterior casing for limiting the expansion and contraction of said interior casing, a gaseous medium under a substantially constant predetermined reference pressure sealed within one of said casings, and means for connecting the interior of the other of said casings to a source of gaseous medium under an operating pressure, said pressures normally being such that the effect thereof is to move said interior casing against said stop means, whereby said interior casing is biased by its own resiliency and upon a predetermined reduction in said operating pressure assumes a relaxed condition.

13. In apparatus of the class described, a rigid casing comprising a hollow cup-like cover, a flexible casing comprising a resilient bellows within said cover and secured at one end to said rigid casing, a hollow cup-like indicating member nested within said cover and secured to the free end of said bellows for linear movement relative to said cover upon expansion and contraction of said bellows, a portion of said cover being transparent to permit viewing of said indicating member from outside the rigid casing, means for limiting the movement of said indicating member by the bellows in one direction to a limiting position, a gaseous medium sealed within one of said casings under a substantially constant predetermined reference pressure, means for connecting the interior of the other of said casings to a source of a gaseous medium under a normally substantially constant predetermined operating pressure sufficiently in excess of said reference pressure to actuate said bellows to a biased condition in opposition to said reference pressure and move said member to said limiting position, whereby upon a predetermined reduction in said operating pressure said flexible casing is actuated toward a relaxed condition and moves said indicating member in the opposite direction away from said limiting position.

14. Apparatus as defined in claim 13 comprising valve means for closing said means for connecting the interior of said other casing to said source, normally closed connecting means for connecting the interior of said other casing to the atmosphere at the will of an operator, and flow restricting means in said last-named connecting means to simulate a slow leak from and reduction of gaseous pressure within said other casing.

References Cited by the Examiner
UNITED STATES PATENTS

| | | | |
|---|---|---|---|
| 1,641,387 | 9/1927 | Ingram | 73—410 |
| 1,713,160 | 5/1929 | Auckland | 73—410 |
| 1,950,107 | 3/1934 | Guinn et al. | 73—410 |
| 2,032,245 | 2/1936 | Wotring | 73—410 |
| 2,185,971 | 1/1940 | Achtel et al. | 73—410 |

FOREIGN PATENTS
73,501 12/1951 Denmark.

LOUIS J. CAPOZI, *Primary Examiner.*